(12) United States Patent
Anderson et al.

(10) Patent No.: US 6,646,758 B1
(45) Date of Patent: Nov. 11, 2003

(54) METHODS AND ARRANGEMENTS FOR IMPROVED PAPER HANDLING BASED ON PRINTER CONFIGURATION STATUS INFORMATION

(75) Inventors: James E. Anderson, Meridian, ID (US); Rich Forcier, Nampa, ID (US); Robert E. Pentecost, Boise, ID (US); Kris R. Livingston, Boise, ID (US); Mark Muguira, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/495,153

(22) Filed: Jan. 31, 2000

(51) Int. Cl.[7] ............................................... G06K 15/00
(52) U.S. Cl. ..................................... 358/1.15; 358/498
(58) Field of Search ........................... 358/1.1, 1.4, 1.8, 358/1.13, 1.15, 498, 401; 347/19, 65, 138, 142, 264; 399/16, 20, 45, 87, 124; 355/23, 24, 26, 97; 271/3.01, 3.14, 6.1, 9.01, 9.06; 101/40, 43, 44, 53

(56) References Cited

U.S. PATENT DOCUMENTS

| | | | |
|---|---|---|---|
| 4,302,098 A | 11/1981 | Kan et al. ....................... 355/55 |
| 4,829,468 A | 5/1989 | Nonaka et al. ............... 364/900 |
| 4,947,345 A | 8/1990 | Paradise et al. .............. 364/519 |
| 5,031,116 A | 7/1991 | Shukunami et al. ......... 364/519 |
| 5,081,595 A | 1/1992 | Moreno et al. .............. 395/111 |
| 5,129,639 A | 7/1992 | DeHority ..................... 270/1.1 |
| 5,172,178 A | 12/1992 | Oushiden et al. ............ 355/311 |
| 5,245,368 A | 9/1993 | Farrell et al. ................. 358/401 |
| 5,305,020 A | * 4/1994 | Gibbons et al. ............. 347/177 |
| 5,327,526 A | 7/1994 | Nomura et al. .............. 395/115 |
| 5,371,837 A | 12/1994 | Kimber et al. ............... 395/114 |
| 5,377,016 A | 12/1994 | Kashiwagi et al. .......... 358/403 |
| 5,393,043 A | 2/1995 | Nitta .............................. 271/9 |
| 5,442,432 A | * 8/1995 | Tani ............................. 399/410 |
| 5,483,889 A | 1/1996 | Hoberock et al. ........... 101/232 |
| 5,511,150 A | 4/1996 | Beaudet et al. .............. 395/113 |
| 5,523,822 A | 6/1996 | Tsuda ........................... 355/208 |
| 5,548,406 A | * 8/1996 | Aihara ......................... 358/296 |
| 5,550,957 A | 8/1996 | Davidson, Jr. et al. ...... 395/114 |
| 5,574,551 A | 11/1996 | Kazakoff ....................... 399/45 |
| 5,669,040 A | * 9/1997 | Hisatake ........................ 399/83 |
| 5,690,324 A | * 11/1997 | Otomo et al. ............. 270/58.02 |
| 5,692,111 A | 11/1997 | Marbry et al. ............... 395/114 |
| 5,699,493 A | 12/1997 | Davidson, Jr. et al. ...... 395/114 |
| 5,717,841 A | 2/1998 | Farrell et al. ................ 395/114 |
| 5,768,483 A | 6/1998 | Maniwa et al. .............. 395/114 |
| 5,774,356 A | 6/1998 | Hisatake et al. ............. 364/148 |
| 5,791,790 A | 8/1998 | Bender et al. .................. 400/61 |
| 5,905,906 A | 5/1999 | Goffinet et al. .............. 395/828 |
| 5,923,942 A | 7/1999 | Nuggehalli et al. .......... 399/389 |
| 6,570,667 B1 | * 5/2003 | Hattori et al. ............... 358/1.15 |
| 6,594,545 B1 | * 7/2003 | Kakigi ......................... 700/223 |

* cited by examiner

Primary Examiner—Gabriel Garcia

(57) ABSTRACT

Methods and arrangements are provided for use in a printer and associated computer(s). The printer is configured to overcome potential print job configuration errors by gathering current printer configuration status data with respect to the available print media and comparing the current print media to the requested print media to make decisions that are likely to provide the user with the appropriate print media. The methods and arrangements provide for additional print media handling capabilities associated with certain types of orientation-dependent print media and simplex and/or duplex printing requirements. The user is only asked to manually intervene when the print media is unavailable or cannot be readily determined from the print job. When this occurs, the additional configuration information that is gathered can be provided to the user to assist with the manual intervention.

28 Claims, 6 Drawing Sheets

METHODS AND ARRANGEMENTS FOR IMPROVED PAPER HANDLING BASED ON PRINTER CONFIGURATION STATUS INFORMATION

RELATED APPLICATIONS

This Patent Application is related to U.S. patent application Ser. No. 09/495,089 filed concurrently herewith.

TECHNICAL FIELD

The present invention relates to computers, and more particularly, to methods and arrangements for improved print media handling within a printer coupled to one or more computers, based on printer configuration status information.

BACKGROUND

A typical office setting includes a plurality of networked computers that are configured to share resources over the network. For example, an office may include a local area network (LAN) that is configured to provide connectivity between several personal computers (PCs) and a laser printer. The laser printer is a shared resource. Each of the PCs can send a print job to the laser printer. Some networks may include the use of a print server to control access to the laser printer. The print server can interface with the PCs and the laser printer to provide enhanced printing services. For example, the print server may maintain a print queue that stores and/or forwards print jobs to the laser printer at a particular time or in a particular order.

When a typical laser printer is connected to the network, an administrator or other user installs the requisite printer driver software on the various machines that have access to the laser printer over the network. Once the proper software has been installed, then the user is further required to configure the printer, as appropriate, for the office requirements. Thus, for example, if the laser printer has a plurality of multiple-purpose print media supply trays/bins, then the user may need to manually configure the tray/bin to match the print media they're loading. This may require adjusting movable guides, setting switches, turning dials, and/or otherwise physically adjusting the print media supply mechanisms associated with the tray/bin. The user may also be required to manually input, for example, through a control panel on the printer, status information about the initial printer configuration. For example, the user may need to define the size and/or type of print media in each of the trays/bins.

It has been found, that many users do not complete such additional configuration steps. Instead, many users simply rely on the default printer configuration settings provided by the manufacturer. Default settings, for example, may define that each of the trays/bins is configured to supply "plain paper" type print media, having dimensions of 8½×11 inches. While such defaults may work just fine for most conventional office settings, should another print media be desired for a print job, then the user may be required to manually intervene with the print job to "trick" or otherwise "force" the printer to complete the print on a different media. Users often revert to such brute-force techniques because they are too busy or are otherwise not interested in reading and following the manuals provided with the laser printer. Most users simply want their printouts.

Indeed, configuring a conventional laser printer can be a daunting task, especially for users that are unfamiliar with the various codes, sizes, or types of print media that may be referred to by the printer manufacturer. Moreover, the user interface provided by the laser printer inputs/displays and printer driver software may further confuse the novice computer user.

There is a need for printers that are "smarter" in the handling of print media, especially print media of different size and types. For example, there is need for more intelligent methods and arrangements that can overcome certain mistakes that the user may cause when attempting to print to certain types of print media. Users are often forced into a trial and error sequence when attempting to reconfigure a printer to print to specialized print media. For example, printing to previously printed letterhead may require the casual user to load and reload the print media until the orientation in correct. The same is true for labels and other less common orientation-dependent print media, such as, previously punched paper.

Further difficulties arise for the novice user who fails to correctly set certain printing attributes associated with print media requiring special printing parameters. For example, because envelopes tend to be thicker than standard plain paper, many laser printers require additional thermal energy (heat) be applied during the toner-fusing phase. If an unknowing user tricks the printer into printing in a normal manner on an envelope, then there may be problems with ink adherence and the print integrity may be unacceptable.

Such problems are made worse in printers that also provide duplex printing (i.e., two-sided printing). Here, the orientation requirements can become very confusing, since the printer is usually configured to flip the print media during printing.

Consequently, there is a need for improved print media handling methods and arrangements within a printer. Preferably, the improved methods and arrangements will reduce the burden placed on the casual user and even experienced users in configuring and/or directing the printer with respect to different size and types of print media. Furthermore, the improved methods and arrangements should increase the information provided to the user, while simplifying the process associated with configuring and subsequently reconfiguring the printer.

SUMMARY

The present invention provides improved print media handling methods and arrangements for use with printers. The improved methods and arrangements substantially reduce the burden placed on the users in configuring and/or directing the printer with respect to different size and types of print media. The improved methods and arrangements tend to increase the information provided to the user, while also simplifying the process associated with configuring and subsequently reconfiguring the printer.

In accordance with certain aspects of the present invention, for example, a method is provided for use with a printer. The method includes determining the current configuration of at least one supply tray that is configured to supply a print media to the printer. For example, the current configuration can include size data and type data associated with the print media. The method further includes receiving a print job from a computer that is operatively coupled to the printer. Here, the print job defines at least one of the following desired printing requirements: a desired print media size, a desired print media type, or a desired tray identifier. Next, the method includes automatically drawing print media from the supply tray if each the following conditions is determined to be exist: 1) if provided, the desired tray identifier matches a tray identifier associated with the supply tray, 2) if provided, the desired print media size significantly matches the determined size data of the supply tray, or 3) if provided, the desired print media type matches the determined type data of the supply tray. If conditions 1), 2), or 3) are not met, then the method includes prompting the user to place or otherwise provide the desired print media in the supply tray, in which case this new print media is drawn from the supply tray. The method then includes completing the print job using the drawn print media. The method allows the user to be prompted when necessary to configure and/or reconfigure the printer as needed.

BRIEF DESCRIPTION OF THE DRAWINGS

A more complete understanding of the various methods and arrangements of the present invention may be had by reference to the following detailed description when taken in conjunction with the accompanying drawings, in accordance with certain exemplary embodiments of the present invention, wherein.

DETAILED DESCRIPTION

While the following detailed description refers to an exemplary computer network and a shared resource printer, it should be understood that the various methods and arrangements in accordance with the present invention are applicable to all types of computers, networks, direct connections, dedicated printers, laser printers, ink-jet printers, copiers, scan-to-copy devices, and the like.

Figure 1:
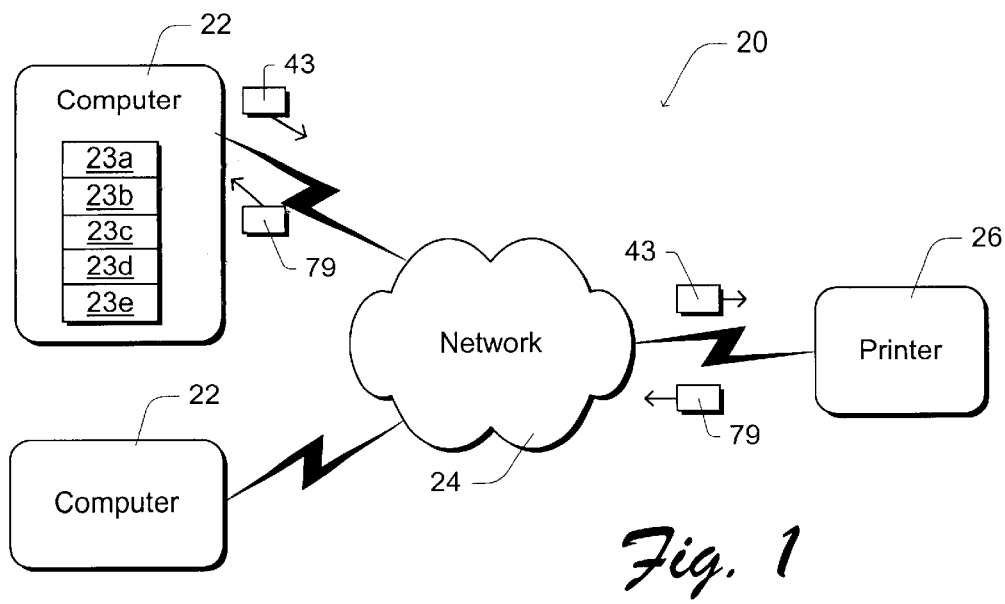
FIG. 1 is a block diagram depicting an exemplary computer network that is suitable for use with the present invention.

With this in mind, FIG. 1 depicts a computer network 20 having a plurality of computers 22 coupled to at least one communications network 24. Communication network 24 is further coupled to at least one printer 26. Computers 22 and printer 26 are configured to communicate with each other over communications network 24. By way of example, communications network 24 can include a local area network (LAN), or the like. Communications network 24 may also include a print server node (not shown). Computers 22 may include hand-held devices, multiprocessor systems, microprocessor-based or programmable consumer electronics, network PCs, minicomputers, mainframe computers, and the like.

For this discussion it is assumed that computers 22 are PCs and that printer 26 is a laser printer. As such, print jobs, for example, as generated in an application running on a PC, are directed from computer 22 over communication network 24 to printer 26.

As graphically depicted in FIG. 1, computer 22 can be operatively configured to generate print job data 43 by one or more instructions provided through an operating system 23a, at least one application 23b, a print driver installer program 23c, a print driver 23d (which may include initial installer instructions that eliminate the need for program 23c), a graphical user interface 23e, and/or other like programs. Print job data 43 is provided to printer 26 via communications network 24.

Printer 26 is configured, in this example, to provide printer configuration status data 79 to computer 22 via communications network 24. As described in more detail in the following sections, the printer configuration status data can be used within computer 22 and/or within printer 26 to provide programs and/or users with additional information about the current configuration of printer 26. This additional information can be used, for example, to reduce the potential for user confusion with respect to the current print media configuration of printer 26, alert the user of potential problems and/or the need to reconfigure printer 26, and enhance the operation of programs running within computer 22.

Figure 2:
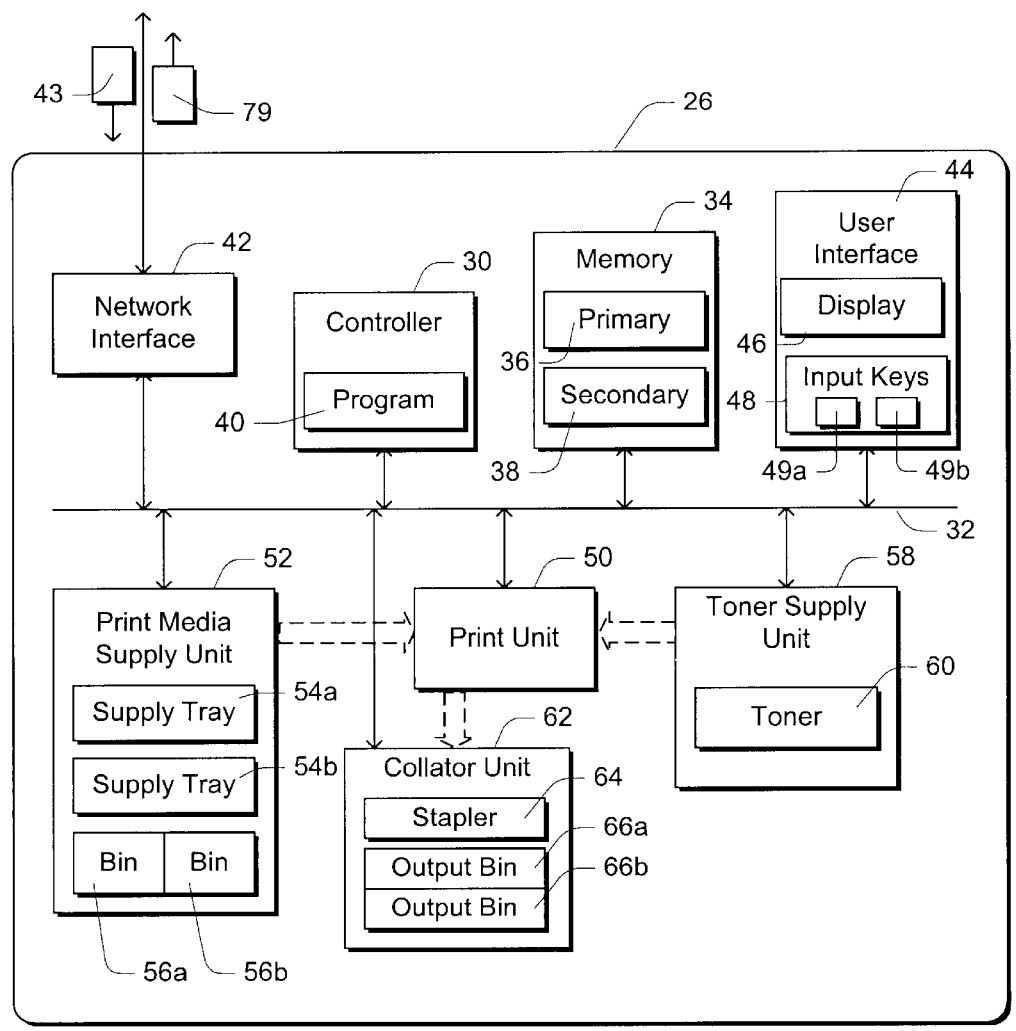
FIG. 2 is a block diagram depicting an exemplary printer for use in the computer network of FIG. 1, for example.

FIG. 2 depicts various exemplary functional subsystems within printer 26. As shown, printer 26 includes a controller 30 that is coupled to a bus 32. Controller 30 can include one or more processors, microprocessors or other like logic that is configured to control various operations within printer 26 and to format and/or otherwise process the print data as required. Bus 32 can include one or more data/control lines and associated circuitry, which are configured to provided communications between controller 30 and other subsystems within printer 26.

For example, a memory 34 is coupled to controller 30 via bus 32. Memory 34 can include any type of data storage. As depicted, memory 34 includes a primary memory 36 and a secondary memory 38. Primary memory 36 typically includes solid-state memory circuits such as, for example, a read only memory (ROM) and a random access memory (RAM). Primary memory 36 can include, for example, computer instructions associated with at least one program 40 designed to support the operation of controller 30. Primary memory 36 may also provide limited capacity for data buffering of a print job. In this example, secondary memory 38 represents a higher capacity data storage device, such as, for example, one or more flash memory circuits, a magnetic hard drive, a read/write optical disc drive, or the like. Preferably, secondary memory provides enough data storage to hold a plurality of variably sized print jobs.

A network interface 42 is also coupled to controller 30 and memory 34 via bus 32. Network interface 42 is configured to receive a print job 43 from computer 22 over communication network 24, for example. Network interface 42 can also output data through communication network 24 to computer 22. Print job 43 is passed through bus 32 to controller 30 and/or memory 34, as required. An exemplary print job 43 is further graphically illustrated in FIG. 3A, and described below in greater detail.

Referring again to FIG. 2, a user interface 44 is coupled to controller 30 via bus 32. User interface 44 is configured to provide information to a user and receive inputs from the user. Here, a display 46 (visual and/or audio) is depicted and configured to provide information about the operation of printer 26 to the user. Input keys 48 are also depicted and configured to allow the user to input information regarding printer operation and/or configuration to controller 30, for example.

A print unit 50 is depicted as being coupled to controller 30 via bus 32. Print unit 50 includes mechanisms that are arranged to selectively apply ink (e.g., liquid ink, toner, etc.) to a print media (e.g., paper, plastic, fabric, etc.) in accordance with print data within print job 43. Thus, for example, print unit 50 can include a conventional laser printing mechanism that selectively causes toner to be applied to an intermediate surface of a drum or belt. The intermediate surface can then be brought within close proximity of a print media in a manner that causes the toner to be transferred to the print media in a controlled fashion. The toner on the print media can then be more permanently fixed to the print media, for example, by selectively applying thermal energy to the toner. Print unit 50 can also be configured to support duplex printing, for example, by selectively flipping or turning the print media as required to print on both sides. Those skilled in the art will recognize that there are many different types of print units available, and that for the purposes of the present invention print unit 50 can include any of these various types.

A print media supply unit 52 is coupled to controller 30 via bus 32, for example. Print media supply unit 52 includes mechanisms that are designed to selectively provide the requisite print media for a given print job 43 to print unit 50. In this example, print media supply unit 52 includes two supply trays 54a–b , and two supply bins 56a–b. Supply trays 54a–b are preferably configurable by the user to accept, store, and/or deliver various sizes and types of print media. Thus, for example, supply tray 54a may be manually or automatically configurable for letter size paper (8.5×11 inches), legal size paper (8.5×14 inches), executive size paper (7.25×10.5 inches), A4 size paper (8.27×11.69 inches), B5 size paper (7.17×10.12 inches), and/or other similar standard/custom sizes. Supply tray 54a may also be configurable for special types of print media, such as, for example, preprinted letterhead stock, transparent stock, prepunched stock, colored stock, etc.

Supply tray 54b may be configured the same as supply tray 54a, or may be configured differently. For example, supply tray 54b may be configurable for larger print media, such as, ledger size paper (11×17 inches), A3 size paper (11.69×16.54 inches). Supply trays 54a–b may also provide for manual insertion of print media by the user. Supply bins 56a–b can be configured similar to supply trays 54a–b. Indeed, supply bins 56a–b may be included within a single supply tray. For the purposes of this example, it will be assumed that supply bins 56a–b are configured to hold different sized envelopes. Thus, for example, supply bin 56a may be configured to hold commercial #10 envelopes (4.1× 9.5 inches) and supply bin 56b may be configured to hold C5 size envelopes (6.4×9.1 inches).

Print media supply unit 52 is preferably configured to identify the size and possibly the type of print media provided/available from supply trays 54a–b and supply bins 56a–b. Print media supply unit 52 may also be configured to support special simplex and duplex printing by selectively flipping or otherwise orienting print media as required to allow for one-sided or two-sided printing. This can be accomplished by specifying a particular supply tray and/or by specifying a particular print media type, for example. As mentioned in the background section above, for orientation-dependent print media it is important that the printed image be properly oriented with the various features of the print media. Consequently, controller 30 can be configured to make decisions regarding a particular print job based on the availability, size and type of the requisite print media.

A toner supply unit 58 is also coupled to controller 30 via bus 32. Toner supply unit 58 is configured to provide toner (ink) to print unit 50. As depicted in FIG. 2, toner supply unit 58 includes supply of toner 60. Toner 60 can include one or more colors/types of toner (ink) that can be selectively provided to print unit 50 as needed. Toner supply unit 58 may also be configured to provide information about toner 60 (e.g., availability, levels, etc.) to controller 30. Thus, controller 30 can be configured to make decisions regarding a particular print job based on the availability of the requisite toner.

An optional collator unit 62 is coupled to controller 30 via bus 32. Collator unit 62 is configured to receive print media (post printing) from print unit 50 and to selectively control handing of the print media. Thus, for example, collator unit 62 includes a stapler 64 for stapling pages together, and output bins 66a–b for collecting and providing the completed print job to the user. Collator unit 62 may also be configured to provide information about stapler 64, or output bins 66a–b (e.g., empty, full, blocked, etc.) to controller 30. Thus, controller 30 can be further configured to make decisions regarding a particular print job based on the availability of the collator capabilities.

Figure 3A:
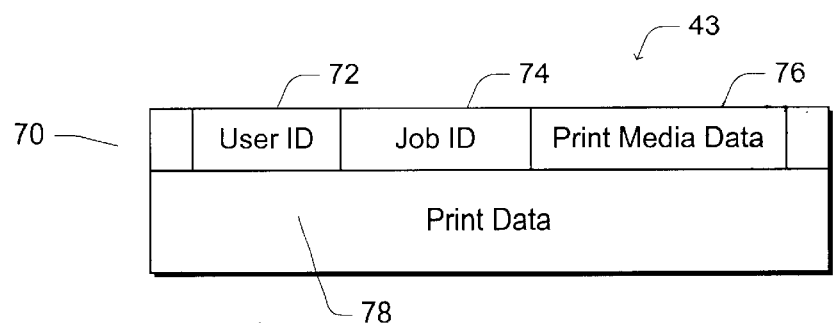
FIG. 3A is block diagram graphically depicting print job data for use in the computer network of FIG. 1, for example.

Reference is now made to the exemplary print job 43 graphically depicted in FIG. 3A. As shown, this exemplary print job 43 provides control data 70, which includes a user ID 72, a job ID 74, and print media data 76 to printer 26. Additionally, print job 43 includes the necessary print data 78 associated with the image to be printed on the print media. User ID 72 includes data that identifies the user who initiated print job 43. Thus, for example, user ID 72 can include a name of the user or a computer identifier number. Job ID 74 includes data that differentiates print job 43 from recent and near future print jobs. Thus, for example, a job sequence number may be included in job ID 74. Print media data 76 includes information regarding the requested or required size/type of print media to be used in completing the print job. Thus, for example, print media data 76 may indicate that a particular size paper is to be used, and/or that a particular type of print media is to be used for the print job. Consequently, controller 30 is responsive to all or part of control data 70 while processing print job 43.

Figure 3B:
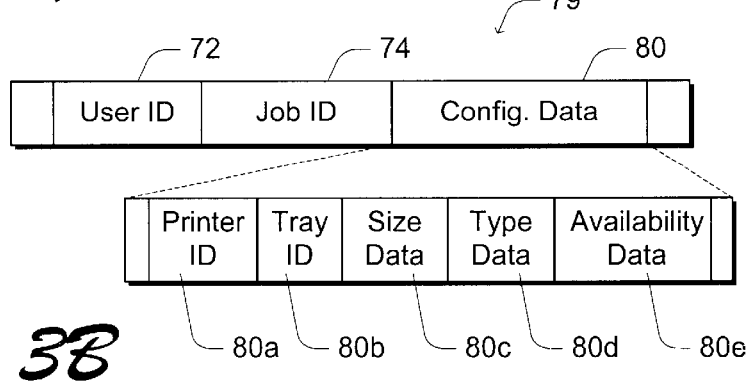
FIG. 3B is block diagram graphically depicting printer status configuration data for use in the computer network of FIG. 1, for example

FIG. 3B graphically depicts exemplary printer configuration status data 79 generated by printer 26. In this example, user ID 72 and/or print job ID 74 may be combined or otherwise associated the current configuration data 80. In other examples, only configuration data 80 may be included. Configuration data 80 may include a printer ID 80a and additional information about the current configuration and/or status of printer 26. By way of example, configuration data 80 can include a print media supply tray identifier 80b associated with a particular supply tray/bin 54/56, print media size data 80c and print media type data 80d further identifying the print media configuration of the particular supply tray/bin 54/56, and print media availability data 80e identifying the availability of print media within the particular supply tray/bin 54/56.

Figure 4:
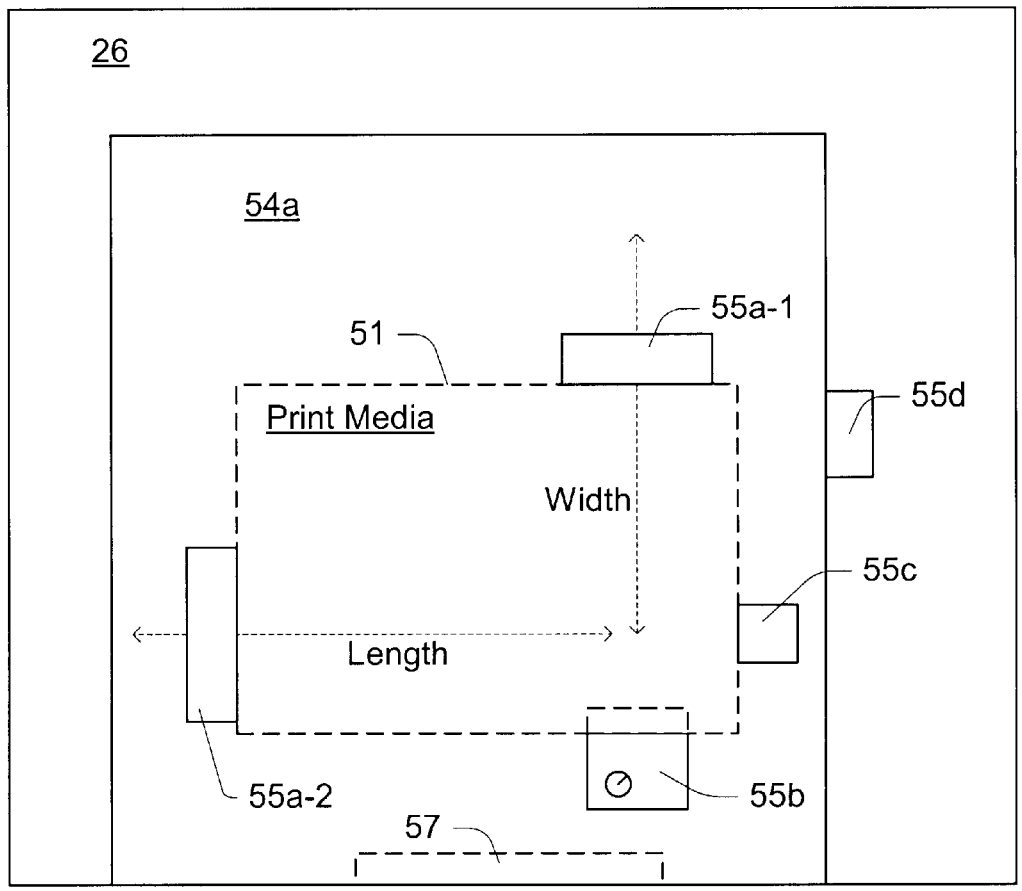
FIG. 4 is a block diagram depicting an exemplary print media tray arrangement for use in the printer of FIG. 2, for example.

FIG. 4 is a block diagram depicting an exemplary print media supply tray 54a within printer 26. As depicted, print media supply tray 54a is configurable to hold a plurality of sheets of print media 51.

Adjustable guides 55a–1 and 55a–2 are detectable mechanisms that are provided to define the width and length, respectively, of print media 51. For example, the user can mechanically move guides 55a–1 and 55a–2 during configuration/reconfiguration, and/or loading/unloading of the print media. The position or placement of guides 55a–1 and 55a–2 is detectable, for example, through mechanical and/or electrical sensors, by controller 30 or similar processing resources within print media supply unit 52. In this manner, controller 30, for example, is able to detect or otherwise determine print media size data 80c for print media supply tray 54a. Those skilled in the art will recognize that other types of input devices, such as, for example, dials, etc., may be also be used to allow the user to selectively define the dimensions of print media 51.

The exemplary print media tray 54a further includes a print media type detectable mechanism 55b. Print media type detectable mechanism 55b may include, for example, a dial or other input device that allows the user to selectively define the type of print media within print media supply tray 54a. In certain implementations, print media type detectable mechanism 55b may include automatic sensors that are configured to detect the type of print media 51 within tray 54a. For example, one or more optical sensors may be employed to detect transparent or non-opaque print media, color media, pre-punched media (e.g., three-ring punched paper). Optical sensors may also be configured to identify pre-printed or other types of marked print media, for example, by contrast comparison of portions of the print media. Whether manual and/or automatic in operation, print media type detectable mechanism 55b is detectable, for example, by controller 30 or similar processing resources within print media supply unit 52. In this manner, controller 30, for example, is able to detect or otherwise determine print media type data 80d for print media supply tray 54a.

A print media present detectable mechanism 55c is configured to detect the presence and/or availability of print media 51 within tray 54a. Here, for example, print media present detectable mechanism 55c may be mechanically or electrically responsive in someway to the presence of print media 51. Print media present detectable mechanism 55c is detectable, for example, by controller 30 or similar processing resources within print media supply unit 52. In this manner, controller 30, for example, is able to detect or otherwise determine print media availability data 80d for print media supply tray 54a.

As shown, print media supply tray 54a may be further associated with a tray position detectable mechanism 55d. Tray position detectable mechanism 55d can be configured to be mechanically and/or electrically responsive to the movement and/or position of tray 54a. Thus, for example, if tray 54a is a drawer-operated type of tray, then tray position detectable mechanism 55d may detect when tray 54a is open and/or closed by the user. If, on the other hand, tray 54a is a shelf type of tray, then tray position detectable mechanism 55d may detect when tray 54a is being loaded and/or unloaded by the user. Tray position detectable mechanism 55d is detectable, for example, by controller 30 or similar processing resources within print media supply unit 52. In this manner, controller 30, for example, is able to detect or otherwise determine when the user is engaged in some form of manual intervention with print media supply tray 54a.

As an alternative or further enhancement, a tray-mounted display 57 can be included, for example, on a visible portion of tray 54a. Tray-mounted display 57 can, for example, include a liquid crystal display (LCD) or other similar display and associated controlling resources.

Referring back to FIG. 2, in certain implementations of the present invention, the size and type configuration of print media tray 54a may also (or alternatively) be set by the user via user interface 44. Here, for example, a print media size detectable mechanism 49a and a print media type detectable mechanism 49b may be provided through input keys 48 and/or printer display 46.

Similarly, in certain further implementations of the present invention, the size and type configuration of print media tray 54a are also (or alternatively) settable by the user via computer 22. Here, for example, print driver software 23d and/or graphical user interface 23e can be configured to accept user inputs, as necessary to remotely perform the functions of print media size detectable mechanism 49a and print media type detectable mechanism 49b. The resulting configuration information can then be provided to printer 26 via communications network 24.

Thus, there are a variety of ways to establish the configuration, or to reconfigure printer 26. Those skilled in the art will recognize that other similar arrangements can be employed to provide at least the same amount of detailed information to the user.

As described in the further exemplary methods as described below, printer configuration status data 80 or a portion thereof can further be utilized by controller 30, for example, to better respond to print job 43. In particular, advantages are gained by examining and comparing the desired size/type data with the current the print media size and print media type to make smart decisions about what print media the user most likely intended to request.

Here, in accordance with certain aspects of the present invention, controller 30 is configured to examine the size, type and (optionally) tray selection information provided by the print job. If the user has properly configured the application, print driver, computer, and the printer, then the user's specified requested print media will be drawn from the appropriate print media supply tray 54. For example, controller 30 will compare the requested size with the current size to see if the data is substantially the same (e.g., within a 0–½ inch in width/length, depending upon the print media).

Controller 30 can also examine the requested type to determine if it matches the current print media type. Here, the match process will result in a "match" or a "no-match" decision. For example, a match can result based on an exact match of types, or wherein the current print media type is "unspecified" (e.g., the printer is configured to automatic or unknown) and the user has requested a particular type.

Controller 30 may further be configured to consider a requested tray identifier to determine if the tray identified is currently configured with the size and type of print media requested. As described in the processes below, such analysis can lead to certain decisions that should reduce the burden on the user, and reduce the number of trials and errors associated with using a printer to tackle difficult and specialized print jobs.

Figure 5:
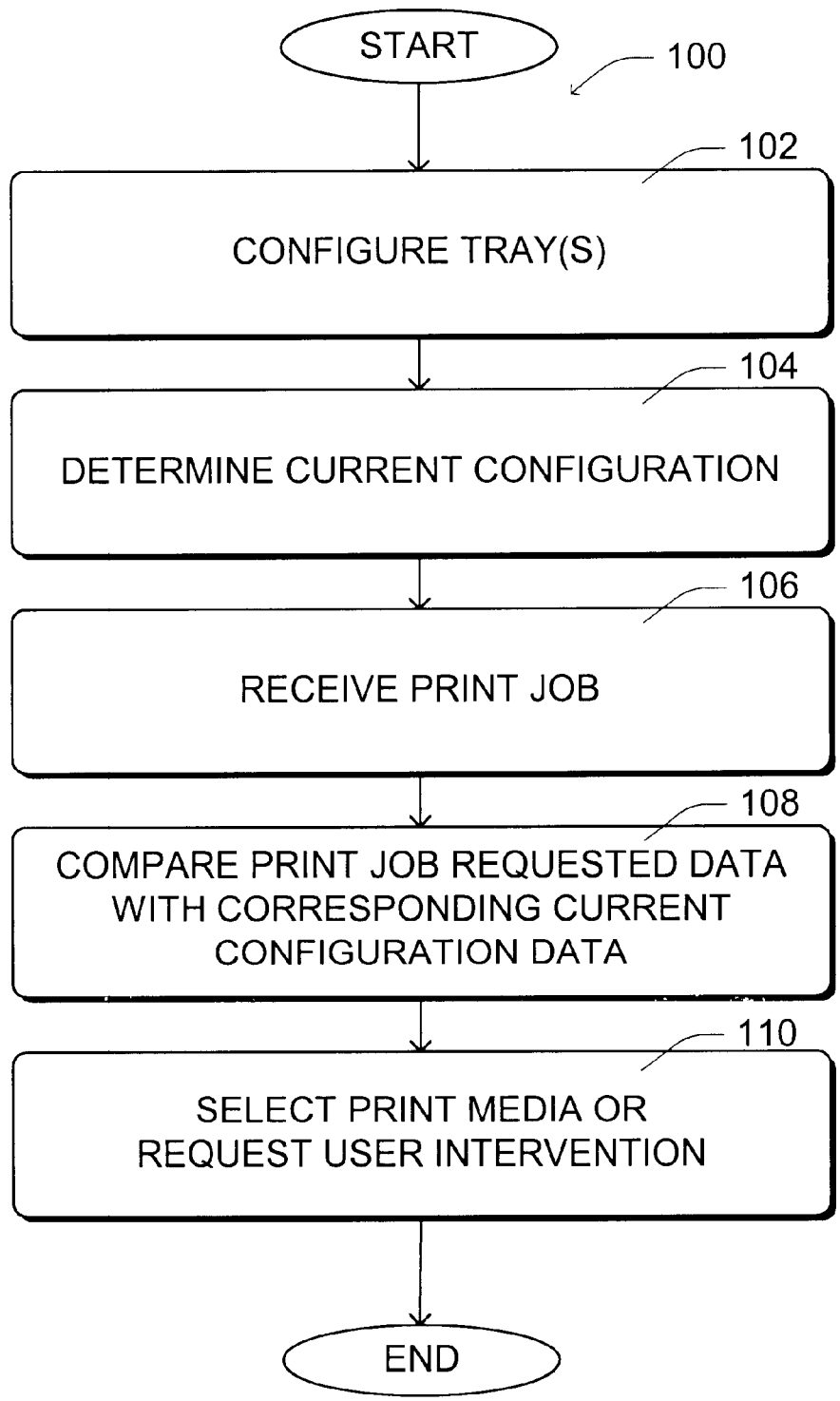
FIG. 5 is a flow-chart depicting an exemplary process for handling print media using printer status configuration data.

With this in mind, reference is made to the flow-chart depicted in FIG. 5. The flow-chart depicts an exemplary process 100 for handling print media using printer status configuration data. In step 102, the print media supply trays 54 and/or supply bins 56 are configured for particular print media. In step 104, controller 30 or other like processing resource in printer 26 determines the current configuration of the various print media supply trays/bins using the available detectable mechanism(s). Next, in step 106, a print job 43 is received by or otherwise provided to controller 30. A comparison of the requested print media data and the current print media data is conducted in step 108. In step 110 a decision is made by controller 30 or other like processing resource within printer 26 as to whether to draw print media and continue processing the print job or if the user will need to intervene in someway to resolve a detected and/or potential problem with the print job or printer.

Step 110 provides the crux of decision making within process 100. In this step several opportunities arise to invoke a "smarter printer" that properly selects a print media for the print job. The comparison of step 108 provides several cases that need to be considered for decision making in step 110.

In step 110 print media is automatically drawn from a print media supply tray if a desired tray identifier matches a tray identifier associated with the supply tray, the desired print media size significantly matches the determined size data of the supply tray, and/or the desired print media type matches the determined type data of the supply tray. Otherwise, step 110 includes prompting the user to provide a desired print media in the supply tray, and drawing print media from the supply tray after the user has provided the desired print media in the supply tray. Step 110 may further include prompting or otherwise reminding the user to return the supply tray to its previous condition/configuration upon completing a print job that required user intervention.

This added intelligence capability significantly reduces the burden placed on the user, who may have unknowingly attempted to print using a poorly configured or flawed print job. Preferably, the decisions in step 110 can be selectively enabled through the print driver software, other software tool, and/or via the user interface 44 on the printer.

Figure 6:
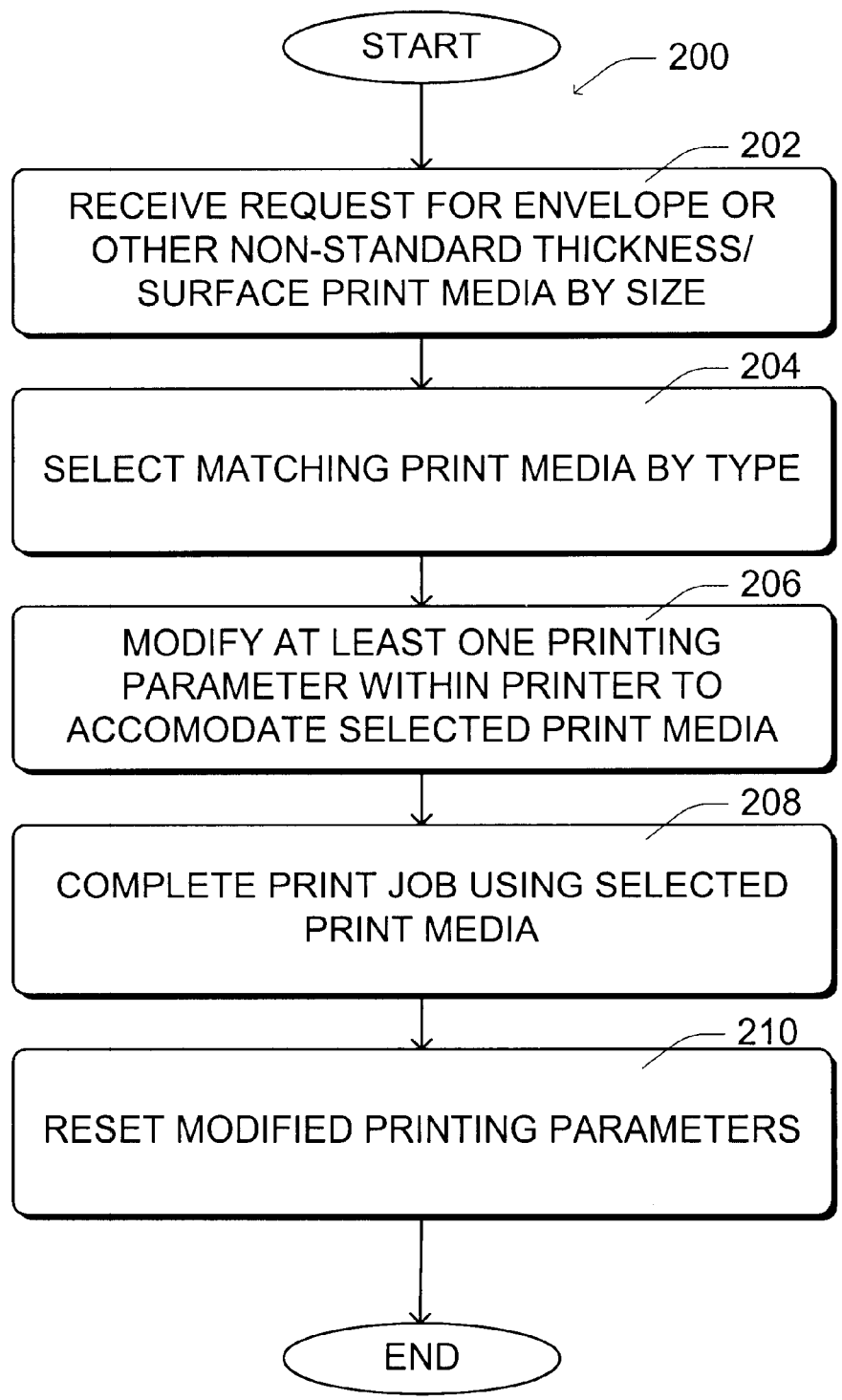
FIG. 6 is a flow-chart depicting an exemplary process for handling envelope type of print media using printer status configuration data.

FIG. 6 is a flow chart depicting an exemplary process 200 for handling envelope or other similar print media using printer status configuration data. Here, in step 202, a print job is received requesting an envelope by size or other non-standard thickness or special surface/material print media by size. In step 204, a matching print media type, if available, is selected by the printer, by size and/or type comparisons/decisions as provided in steps 108–110 of FIG. 5. User intervention may be required in step 204.

Next, in step 206, at least one controllable printing parameter within the printer is modified, as needed, to accommodate the selected print media type. Thus, for example, in a laser printer, a fuser temperature setting within printer unit 50 may be set by controller 30 to a higher than nominal level to compensate for the thickness of the envelope, wherein the nominal level is typically associated with a plain paper type of print media. Those skilled in the art will recognize that other mechanical and/or electrical settings may also be modified in step 206. These would not typically be set if the user is tricking the printer in someway. Here, process 200 helps to reduce such a possibility.

In step 208, the print job is processed and completed using the selected print media. Then, in step 210, the modified printing parameters are reset, for example to nominal/normal settings.

Figure 7:
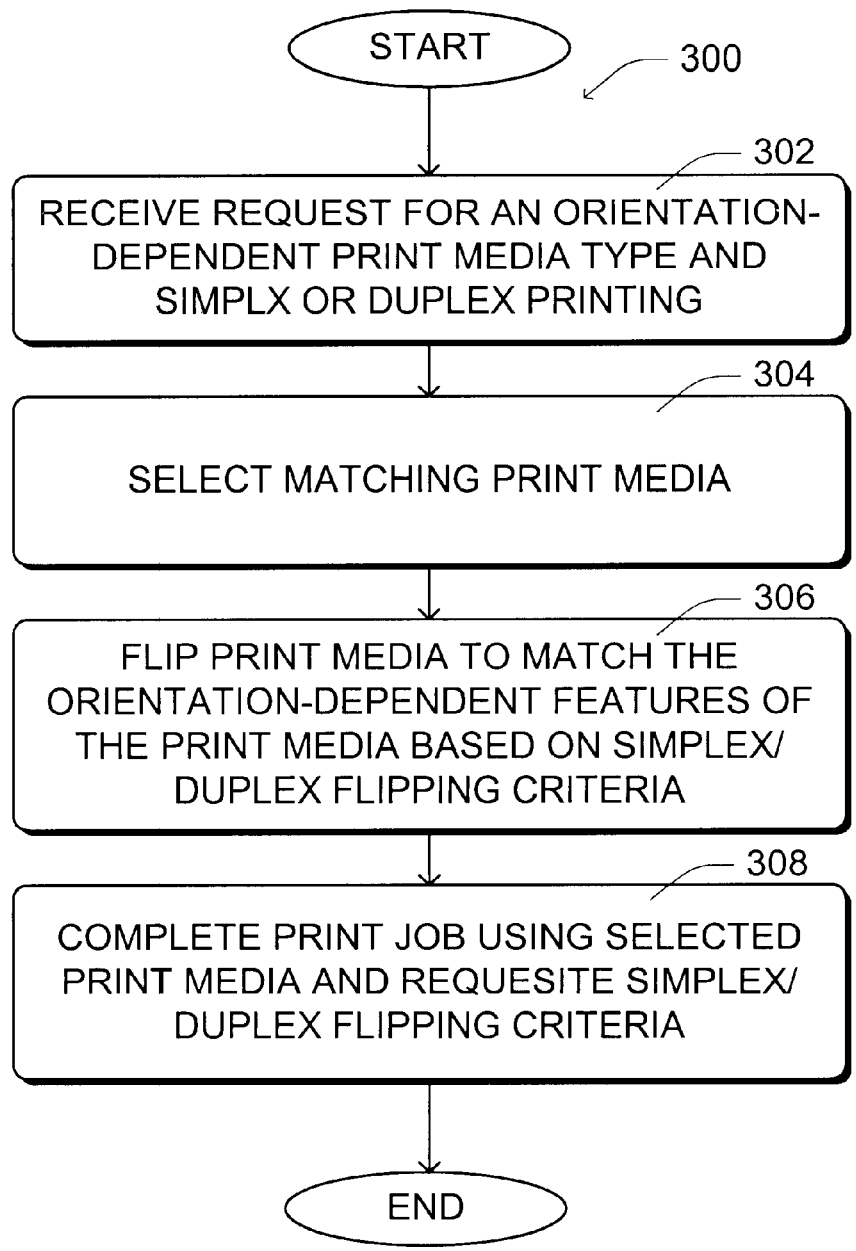
FIG. 7 is a flow-chart depicting an exemplary process for handling simplex and duplex print jobs for orientation-dependent print media using printer status configuration data.

In accordance with still further implementations of the present invention, potential simplex and duplex printing problems are addressed using printer status configuration data. FIG. 7 is a flow-chart depicting an exemplary process 300 for handling simplex and/or duplex print jobs for orientation-dependent print media using printer status configuration data.

In step 302, the print job requests an orientation-dependent print media type and either simplex or duplex printing. In step 304, a matching print media, if available, is selected for example, by size and type comparisons/decisions as provided in steps 108–110 of FIG. 5. User intervention may be required in step 304.

By way of example, a print media is considered to have an orientation-dependent feature if the print media includes previously printed features, multiple toned features, previously punched features, previously folded features, multiple layered features, surface treated features, previously stamped features, and other like features.

In step 306, controller 30 or other like processing resource within printer 20 selectively causes the print media to be flipped over within the printer (as necessary) prior to and during printing, in accord with a programmable simplex or duplex flipping criteria associated with the particular orientation of the print media type. In step 308 the printing and flipping continues (as necessary) until the print job is completed.

In certain further implementations, step 306–308 and the flipping criteria are defined within program 40, for example, and may include the timesaving benefit of recognizing that blank pages need not be processed through the entire printing stage. Thus, in duplex printers, a blank page is not printed and may not require the requisite amount of flipping. Instead, the printed side is processed accordingly and the print media is placed in the correct orientation and provided to collator unit 62, for example.

Thus, the improved methods and arrangements shown and described in the exemplary implementations herein provide additional capabilities that make printers more intelligent and users more productive. The methods and arrangement overcome significant problems associated with configuration errors and/or user confusion by introducing additional information gathering and decision making into the printing process.

Although some preferred implementations of the various methods and arrangements of the present invention have been illustrated in the accompanying Drawings and described in the foregoing Detailed Description, it will be understood that the invention is not limited to the exemplary implementations disclosed, but is capable of numerous rearrangements, modifications and substitutions without departing from the spirit of the invention as set forth and defined by the following claims.

What is claimed is:

1. A method for use with a printer, the method comprising:
   a) determining a current configuration of at least a supply tray configured to supply a print media to the printer, the current configuration including size data and type data associated with the print media;
   b) receiving a print job from a computer that is operatively coupled to the printer, the print job defining at least one desired printing requirement selected from a group comprising a desired print media size, a desired print media type, and a desired tray identifier;
   c) automatically drawing print media from the supply tray if each of the following is determined to be true:
      1) if provided, the desired tray identifier matches a tray identifier associated with the supply tray,
      2) if provided, the desired print media size significantly matches the determined size data of the supply tray,
      3) if provided, the desired print media type matches the determined type data of the supply tray; otherwise,
   d) prompting the user to provide a desired print media in the supply tray, and drawing print media from the supply tray after the user has provided the desired print media in the supply tray; and
   e) completing the print job using the drawn print media.

2. A method as recited in claim 1, further comprising:
   f) upon completion of the print job in step e) using step d), selectively reminding the user to reload the supply tray with a print media as previously configured.

3. A method as recited in claim 1, wherein the supply tray is selectively configurable to hold both standard-sized print media and custom-sized print media.

4. A method as recited in claim 3, wherein step d) further includes selectively displaying current configuration data.

5. A method as recited in claim 3, wherein step d) further includes displaying a request for user intervention on a printer display.

6. A method as recited in claim 5, wherein step d) further includes prompting the user to select a user input key on the printer and providing the user with a selectable listing of supply tray identifiers via a printer user interface, wherein the selectable listing includes at least a portion of the current configuration data of the supply tray.

7. A method as recited in claim 3, wherein step d) further includes displaying a request for user intervention within a graphical user interface on the computer.

8. A method as recited in claim 1, wherein the current size data includes a width measurement and a length measurement.

9. A method as recited in claim 1, wherein the current type data includes an envelope type, and step c) further includes determining a desired envelope type for the print job based on the desired print media size.

10. A method as recited in claim 9, wherein step e) further includes altering at least one operational parameter associated with printing to the print media to compensate for at least the thickness of the print media.

11. A method as recited in claim 10, wherein the at least one parameter includes a fuser temperature setting and step e) further includes setting the fuser temperature setting to a higher or lower than nominal level to compensate for the thickness of the envelope, the nominal level being associated with a plain paper type of print media.

12. A method as recited in claim 1, wherein the print job further identifies that printing is to be simplex or duplex.

13. A method as recited in claim 12, wherein if at least one of the limitations of step c) or step d) is met and simplex printing is requested, then step e) further includes selectively flipping the drawn print media over prior to or after printing, in accord with a programmable simplex flipping criteria, if the current print media type data specifies a print media having at least one orientation-dependent feature.

14. A method as recited in claim 12, wherein if at least one of the limitations of step c) or step d) is met and duplex printing is requested, then the method further includes selectively flipping the print media over prior to or after printing, in accord with a programmable duplex flipping criteria, if the current print media type data specifies a print media having at least one orientation-dependent feature.

15. A method as recited in claim 12, wherein the print media in the supply tray is considered to be orientation-dependent feature if the print media includes at least one of the orientation-dependent features selected from a group comprising previously printed features, multiple toned features, previously punched features, previously folded features, multiple layered features, surface treated features, and previously stamped features.

16. A method as recited in claim 14, wherein, if at least one of the limitations of step c) or step d) is met and duplex printing is requested, then the method further includes selectively skipping printing of blank pages onto the print media.

17. A printer for use with at least one computer, the printer comprising:
at least one print media supply tray that is selectively configurable based at least on a print media size and a print media type; and
at least one controller arranged to:
a) determine a current configuration of at least the supply tray, the current configuration including size data and type data associated with the print media;
b) receive a print job from the computer, the print job defining at least one desired printing requirement selected from a group comprising a desired print media size, a desired print media type, and a desired tray identifier;
c) automatically draw print media from the supply tray if each of the following is determined to be true:
1) if provided, the desired tray identifier matches a tray identifier associated with the supply tray,
2) if provided, the desired print media size significantly matches the determined size data of the supply tray,
3) if provided, the desired print media type matches the determined type data of the supply tray; otherwise,
d) prompt the user to provide a desired print media in the supply tray, and draw print media from the first supply tray after the user has provided the desired print media in the supply tray; and
e) complete the print job using the drawn print media.

18. A printer as recited in claim 17, wherein the controller is further arranged to selectively remind the user to reload the supply tray with a print media as previously configured, upon completion of the print job using in accord with e) and d).

19. A printer as recited in claim 17, wherein the supply tray is selectively configurable to hold both standard-sized print media and custom-sized print media.

20. A printer as recited in claim 19, wherein as part of d) the controller is further arranged to selectively display current configuration data.

21. A printer as recited in claim 19, further comprising a printer display operatively coupled to the controller, and wherein as part of d) the controller is further arranged to display a request for user intervention on the printer display.

22. A printer as recited in claim 21, further comprising a plurality of supply trays a printer user interface and at least one user input key operatively coupled to the controller, and wherein as part of d) the controller is further arranged to:
prompt the user to select the user input; and
provide the user with a selectable listing of the plurality supply trays via a printer user interface, wherein the selectable listing includes at least a portion of the current configuration data of the supply tray.

23. A printer as recited in claim 19, wherein as part of d) the controller is further arranged to display a request for user intervention within a graphical user interface on the computer.

24. A printer as recited in claim 17, wherein the current size data includes a width measurement and a length measurement.

25. A printer as recited in claim 17, wherein the current type data includes an envelope type, and as part of c) the controller is further arranged to step determine a desired envelope type for the print job based on the desired print media size.

26. A printer as recited in claim 25, wherein, if the desired envelope type specifies the envelope type, then as part of e) the controller is further arranged to alter at least one operational parameter associated with printing to the print media to compensate for at least the thickness of the envelope.

27. A printer as recited in claim 26, wherein the at least one parameter includes a fuser temperature setting and as part of e) the controller is further arranged to set the fuser temperature setting to a higher or lower than nominal level to compensate for the thickness of the envelope, the nominal level being associated with a plain paper type of print media.

28. A system comprising:
a printer as recited in claim 17;
a communications network coupled to the printer; and
at least one computer coupled to the communications network and configured to provide the print job to the printer via the communications network.

* * * * *